(12) United States Patent
Cummings et al.

(10) Patent No.: US 7,327,510 B2
(45) Date of Patent: Feb. 5, 2008

(54) PROCESS FOR MODIFYING OFFSET VOLTAGE CHARACTERISTICS OF AN INTERFEROMETRIC MODULATOR

(75) Inventors: William J. Cummings, Millbrae, CA (US); Brian J. Gally, Los Gatos, CA (US)

(73) Assignee: IDC, LLC, San Francisco, CA (US)

( * ) Notice: Subject to any disclaimer, the term of this patent is extended or adjusted under 35 U.S.C. 154(b) by 327 days.

(21) Appl. No.: 11/208,052

(22) Filed: Aug. 19, 2005

(65) Prior Publication Data

US 2006/0066935 A1    Mar. 30, 2006

Related U.S. Application Data

(60) Provisional application No. 60/613,499, filed on Sep. 27, 2004.

(51) Int. Cl.
  *G02B 26/00* (2006.01)
  *G02F 1/03* (2006.01)
(52) U.S. Cl. ........................ 359/291; 359/245
(58) Field of Classification Search ................ 359/291
  See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |

(Continued)

FOREIGN PATENT DOCUMENTS

CN    157313    5/1991

(Continued)

OTHER PUBLICATIONS

Office Action mailed Jun. 1, 2007 in U.S. Appl. No. 11/203,613.

(Continued)

*Primary Examiner*—Jordan Schwartz
*Assistant Examiner*—James C Jones
(74) *Attorney, Agent, or Firm*—Knobbe, Martens, Olson & Bear, LLP

(57) ABSTRACT

An interferometric modulator manufactured according to a particular set of processing parameters may have a non-zero offset voltage. A process has been developed for modifying the processing parameters to shift the non-zero offset voltage closer to zero. For example, the process may involve identifying a set of processing parameters for manufacturing an interferometric modulator that results in a non-zero offset voltage for the interferometric modulator. The set of processing parameters may then be modified to shift the non-zero offset voltage closer to zero. For example, modifying the set of processing parameters may involve modifying one or more deposition parameters used to make the interferometric modulator, applying a current (e.g., a counteracting current) to the interferometric modulator, and/or annealing the interferometric modulator. Interferometric modulators made according to the set of modified processing parameters may have improved performance and/or simpler drive schemes.

38 Claims, 12 Drawing Sheets

U.S. PATENT DOCUMENTS

| | | |
|---|---|---|
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,392,711 A | 7/1983 | Moraw et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,662,746 A | 5/1987 | Hornbeck |
| 4,663,083 A | 5/1987 | Marks |
| 4,666,254 A | 5/1987 | Itoh et al. |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,857,978 A | 8/1989 | Goldburt et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,331,454 A | 7/1994 | Hornbeck |
| 5,339,116 A | 8/1994 | Urbanus et al. |
| 5,345,328 A | 9/1994 | Fritz et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | Van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,535,526 A | 7/1996 | White |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |

| | | | | | | |
|---|---|---|---|---|---|---|
| 5,614,937 | A | 3/1997 | Nelson | 6,288,472 B1 | 9/2001 | Cabuz et al. |
| 5,619,059 | A | 4/1997 | Li et al. | 6,288,824 B1 | 9/2001 | Kastalsky |
| 5,619,365 | A | 4/1997 | Rhoades et al. | 6,295,154 B1 | 9/2001 | Laor et al. |
| 5,619,366 | A | 4/1997 | Rhoads et al. | 6,297,072 B1 | 10/2001 | Tilmans et al. |
| 5,629,790 | A | 5/1997 | Neukermans et al. | 6,323,982 B1 | 11/2001 | Hornbeck |
| 5,633,652 | A | 5/1997 | Kanbe et al. | 6,327,071 B1 | 12/2001 | Kimura |
| 5,636,052 | A | 6/1997 | Arney et al. | 6,331,909 B1 | 12/2001 | Dunfield |
| 5,636,185 | A | 6/1997 | Brewer et al. | 6,335,831 B2 | 1/2002 | Kowarz et al. |
| 5,638,084 | A | 6/1997 | Kalt | 6,356,254 B1 | 3/2002 | Kimura |
| 5,638,946 | A | 6/1997 | Zavracky | 6,358,021 B1 | 3/2002 | Cabuz |
| 5,641,391 | A | 6/1997 | Hunter et al. | 6,376,787 B1 | 4/2002 | Martin et al. |
| 5,646,768 | A | 7/1997 | Kaeiyama | 6,407,851 B1 | 6/2002 | Islam et al. |
| 5,650,881 | A | 7/1997 | Hornbeck | 6,417,868 B1 | 7/2002 | Bock et al. |
| 5,654,741 | A | 8/1997 | Sampsell et al. | 6,433,917 B1 | 8/2002 | Mei et al. |
| 5,657,099 | A | 8/1997 | Doherty et al. | 6,438,282 B1 | 8/2002 | Takeda et al. |
| 5,659,374 | A | 8/1997 | Gale, Jr. et al. | 6,447,126 B1 | 9/2002 | Hornbeck |
| 5,661,591 | A | 8/1997 | Lin et al. | 6,449,084 B1 | 9/2002 | Guo |
| 5,665,997 | A | 9/1997 | Weaver et al. | 6,456,420 B1 | 9/2002 | Goodwin-Johansson |
| 5,673,139 | A | 9/1997 | Johnson | 6,465,355 B1 | 10/2002 | Horsley |
| 5,683,591 | A | 11/1997 | Offenberg | 6,466,190 B1 | 10/2002 | Evoy |
| 5,703,710 | A | 12/1997 | Brinkman et al. | 6,466,354 B1 | 10/2002 | Gudeman |
| 5,710,656 | A | 1/1998 | Goosen | 6,466,358 B2 | 10/2002 | Tew |
| 5,726,480 | A | 3/1998 | Pister | 6,473,072 B1 | 10/2002 | Comiskey et al. |
| 5,739,945 | A | 4/1998 | Tayebati | 6,473,274 B1 | 10/2002 | Maimone et al. |
| 5,740,150 | A | 4/1998 | Uchimaru et al. | 6,480,177 B2 | 11/2002 | Doherty et al. |
| 5,745,193 | A | 4/1998 | Urbanus et al. | 6,496,122 B2 | 12/2002 | Sampsell |
| 5,745,281 | A | 4/1998 | Yi et al. | 6,545,335 B1 | 4/2003 | Chua et al. |
| 5,751,469 | A | 5/1998 | Arney et al. | 6,548,908 B2 | 4/2003 | Chua et al. |
| 5,771,116 | A | 6/1998 | Miller et al. | 6,549,338 B1 | 4/2003 | Wolverton et al. |
| 5,784,190 | A | 7/1998 | Worley | 6,552,840 B2 | 4/2003 | Knipe |
| 5,784,212 | A | 7/1998 | Hornbeck | 6,574,033 B1 | 6/2003 | Chui et al. |
| 5,786,927 | A | 7/1998 | Greywall et al. | 6,589,625 B1 | 7/2003 | Kothari et al. |
| 5,793,504 | A | 8/1998 | Stoll | 6,600,201 B2 | 7/2003 | Hartwell et al. |
| 5,808,780 | A | 9/1998 | McDonald | 6,606,175 B1 | 8/2003 | Sampsell et al. |
| 5,808,781 | A | 9/1998 | Arney et al. | 6,608,268 B1 | 8/2003 | Goldsmith |
| 5,818,095 | A | 10/1998 | Sampsell | 6,624,944 B1 | 9/2003 | Wallace et al. |
| 5,825,528 | A | 10/1998 | Goosen | 6,625,047 B1 | 9/2003 | Coleman, Jr. |
| 5,835,255 | A | 11/1998 | Miles | 6,630,786 B2 | 10/2003 | Cummings et al. |
| 5,838,484 | A | 11/1998 | Goossen et al. | 6,632,698 B2 | 10/2003 | Ives |
| 5,842,088 | A | 11/1998 | Thompson | 6,635,919 B1 | 10/2003 | Melendez et al. |
| 5,867,302 | A | 2/1999 | Fleming | 6,643,069 B2 | 11/2003 | Dewald |
| 5,905,482 | A | 5/1999 | Hughes et al. | 6,650,455 B2 | 11/2003 | Miles |
| 5,912,758 | A | 6/1999 | Knipe et al. | 6,657,832 B2 | 12/2003 | Williams et al. |
| 5,943,158 | A | 8/1999 | Ford et al. | 6,660,656 B2 | 12/2003 | Cheung et al. |
| 5,959,763 | A | 9/1999 | Bozler et al. | 6,666,561 B1 | 12/2003 | Blakley |
| 5,986,796 | A | 11/1999 | Miles | 6,674,090 B1 | 1/2004 | Chua et al. |
| 5,994,174 | A | 11/1999 | Carey et al. | 6,674,562 B1 | 1/2004 | Miles et al. |
| 5,999,304 | A * | 12/1999 | Sanders et al. ............. 359/237 | 6,674,563 B2 | 1/2004 | Chui et al. |
| 6,028,690 | A | 2/2000 | Carter et al. | 6,680,792 B2 | 1/2004 | Miles |
| 6,038,056 | A | 3/2000 | Florence et al. | 6,710,908 B2 | 3/2004 | Miles et al. |
| 6,040,937 | A | 3/2000 | Miles | 6,741,377 B2 | 5/2004 | Miles |
| 6,046,840 | A | 4/2000 | Huibers | 6,741,383 B2 | 5/2004 | Huibers et al. |
| 6,049,317 | A | 4/2000 | Thompson et al. | 6,741,384 B1 | 5/2004 | Martin et al. |
| 6,055,090 | A | 4/2000 | Miles | 6,741,503 B1 | 5/2004 | Farris et al. |
| 6,056,406 | A | 5/2000 | Park et al. | 6,747,785 B2 | 6/2004 | Chen et al. |
| 6,061,075 | A | 5/2000 | Nelson et al. | 6,747,800 B1 | 6/2004 | Lin |
| 6,097,145 | A | 8/2000 | Kastalsky et al. | 6,775,174 B2 | 8/2004 | Huffman et al. |
| 6,099,132 | A | 8/2000 | Kaeriyama | 6,778,155 B2 | 8/2004 | Doherty et al. |
| 6,100,872 | A | 8/2000 | Aratani et al. | 6,794,119 B2 | 9/2004 | Miles |
| 6,113,239 | A | 9/2000 | Sampsell et al. | 6,809,788 B2 | 10/2004 | Yamada et al. |
| 6,147,790 | A | 11/2000 | Meier et al. | 6,811,267 B1 | 11/2004 | Allen et al. |
| 6,158,156 | A | 12/2000 | Patrick | 6,819,469 B1 | 11/2004 | Koba |
| 6,160,833 | A | 12/2000 | Floyd et al. | 6,822,628 B2 | 11/2004 | Dunphy et al. |
| 6,171,945 | B1 | 1/2001 | Mandal et al. | 6,829,132 B2 | 12/2004 | Martin et al. |
| 6,172,797 | B1 | 1/2001 | Huibers | 6,853,129 B1 | 2/2005 | Cummings et al. |
| 6,180,428 | B1 | 1/2001 | Peeters et al. | 6,855,610 B2 | 2/2005 | Tung et al. |
| 6,195,196 | B1 | 2/2001 | Kimura et al. | 6,859,218 B1 | 2/2005 | Luman et al. |
| 6,201,633 | B1 | 3/2001 | Peeters et al. | 6,861,277 B1 | 3/2005 | Monroe et al. |
| 6,215,221 | B1 | 4/2001 | Cabuz et al. | 6,862,022 B2 | 3/2005 | Slupe |
| 6,232,936 | B1 | 5/2001 | Gove et al. | 6,862,029 B1 | 3/2005 | D'Souza et al. |
| 6,239,777 | B1 | 5/2001 | Sugahara et al. | 6,867,896 B2 | 3/2005 | Miles |
| 6,243,149 | B1 | 6/2001 | Swanson et al. | 6,870,581 B2 | 3/2005 | Li et al. |
| 6,282,010 | B1 | 8/2001 | Sulzbach et al. | 6,870,654 B2 | 3/2005 | Lin et al. |

| | | |
|---|---|---|
| 6,882,458 B2 | 4/2005 | Lin et al. |
| 6,882,461 B1 | 4/2005 | Tsai et al. |
| 6,891,658 B2 | 5/2005 | Whitehead et al. |
| 6,912,022 B2 | 6/2005 | Lin et al. |
| 6,947,200 B2 | 9/2005 | Huibers |
| 6,952,303 B2 | 10/2005 | Lin et al. |
| 6,958,847 B2 | 10/2005 | Lin |
| 6,959,990 B2 | 11/2005 | Penn |
| 7,008,812 B1 | 3/2006 | Carley |
| 7,053,737 B2 | 5/2006 | Schwartz et al. |
| 7,075,700 B2 | 7/2006 | Muenter |
| 7,123,216 B1 | 10/2006 | Miles |
| 2001/0003487 A1 | 6/2001 | Miles |
| 2001/0028503 A1 | 10/2001 | Flanders et al. |
| 2002/0014579 A1 | 2/2002 | Dunfield |
| 2002/0015215 A1 | 2/2002 | Miles |
| 2002/0021485 A1 | 2/2002 | Pilossof |
| 2002/0024711 A1 | 2/2002 | Miles |
| 2002/0027636 A1 | 3/2002 | Yamada |
| 2002/0054422 A1 | 5/2002 | Carr et al. |
| 2002/0054424 A1 | 5/2002 | Miles |
| 2002/0075555 A1 | 6/2002 | Miles |
| 2002/0114558 A1 | 8/2002 | Nemirovsky |
| 2002/0126364 A1 | 9/2002 | Miles |
| 2002/0139981 A1 | 10/2002 | Young |
| 2002/0146200 A1 | 10/2002 | Kurdle et al. |
| 2002/0149828 A1 | 10/2002 | Miles |
| 2002/0149850 A1 | 10/2002 | Heffner et al. |
| 2002/0167072 A1 | 11/2002 | Andosca |
| 2002/0167730 A1 | 11/2002 | Needham et al. |
| 2002/0186483 A1 | 12/2002 | Hagelin et al. |
| 2003/0015936 A1 | 1/2003 | Yoon et al. |
| 2003/0016428 A1 | 1/2003 | Kato et al. |
| 2003/0021004 A1 | 1/2003 | Cunningham et al. |
| 2003/0029705 A1 | 2/2003 | Qui et al. |
| 2003/0043157 A1 | 3/2003 | Miles |
| 2003/0053078 A1 | 3/2003 | Missey et al. |
| 2003/0053233 A1 | 3/2003 | Felton |
| 2003/0054925 A1 | 3/2003 | Burkhardt |
| 2003/0069413 A1 | 4/2003 | Pai et al. |
| 2003/0072070 A1 | 4/2003 | Miles |
| 2003/0156315 A1 | 8/2003 | Li et al. |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0210851 A1 | 11/2003 | Fu et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0051929 A1 | 3/2004 | Sampsell et al. |
| 2004/0056742 A1 | 3/2004 | Dabbaj |
| 2004/0058532 A1 | 3/2004 | Miles et al. |
| 2004/0075967 A1 | 4/2004 | Lynch et al. |
| 2004/0080035 A1 | 4/2004 | Delapierre |
| 2004/0080807 A1 | 4/2004 | Chen et al. |
| 2004/0100594 A1 | 5/2004 | Huibers et al. |
| 2004/0100680 A1 | 5/2004 | Huibers et al. |
| 2004/0124483 A1 | 7/2004 | Partridge et al. |
| 2004/0125281 A1 | 7/2004 | Lin |
| 2004/0125347 A1 | 7/2004 | Patel et al. |
| 2004/0136045 A1 | 7/2004 | Tran |
| 2004/0140557 A1 | 7/2004 | Sun et al. |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard et al. |
| 2004/0150939 A1 | 8/2004 | Huff |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park et al. |
| 2004/0184766 A1 | 9/2004 | Kim et al. |
| 2004/0201908 A1 | 10/2004 | Kaneko |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0233503 A1 | 11/2004 | Kimura |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0002082 A1 | 1/2005 | Miles |
| 2005/0003667 A1 | 1/2005 | Lin et al. |
| 2005/0014374 A1 | 1/2005 | Partridge et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046922 A1 | 3/2005 | Lin et al. |
| 2005/0046948 A1 | 3/2005 | Lin |
| 2005/0057442 A1 | 3/2005 | Way |
| 2005/0068583 A1 | 3/2005 | Gutkowski et al. |
| 2005/0068605 A1 | 3/2005 | Tsai |
| 2005/0068606 A1 | 3/2005 | Tsai |
| 2005/0069209 A1 | 3/2005 | Damera-Venkata et al. |
| 2005/0078348 A1 | 4/2005 | Lin |
| 2005/0157364 A1 | 7/2005 | Lin |
| 2005/0168849 A1 | 8/2005 | Lin |
| 2005/0195462 A1 | 9/2005 | Lin |
| 2005/0195467 A1 | 9/2005 | Kothari et al. |
| 2005/0202649 A1 | 9/2005 | Hung et al. |
| 2005/0249966 A1 | 11/2005 | Tung et al. |
| 2006/0024880 A1 | 2/2006 | Chui et al. |
| 2006/0044298 A1* | 3/2006 | Mignard et al. ............ 345/205 |
| 2006/0044654 A1 | 3/2006 | Vandorpe et al. |
| 2006/0065940 A1 | 3/2006 | Kothari et al. |
| 2006/0066599 A1 | 3/2006 | Chui et al. |
| 2006/0066640 A1 | 3/2006 | Kothari et al. |
| 2006/0067643 A1 | 3/2006 | Kothari et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0077507 A1 | 4/2006 | Chui et al. |
| 2006/0077508 A1 | 4/2006 | Chui et al. |
| 2006/0077515 A1 | 4/2006 | Cummings et al. |
| 2006/0077516 A1 | 4/2006 | Kothari |
| 2006/0077527 A1 | 4/2006 | Kothari et al. |
| 2006/0077533 A1 | 4/2006 | Miles et al. |
| 2006/0079048 A1 | 4/2006 | Sampsell |
| 2006/0139723 A9 | 6/2006 | Miles |

FOREIGN PATENT DOCUMENTS

| | | |
|---|---|---|
| DE | 4108966 A1 | 8/1992 |
| DE | 10228946 A1 | 1/2004 |
| EP | 0 310 176 A2 | 4/1989 |
| EP | 0 361 981 | 4/1990 |
| EP | 0 667 548 A1 | 8/1995 |
| EP | 0 788 005 | 8/1997 |
| EP | 1275997 | 1/2003 |
| EP | 1 435 336 | 7/2004 |

| | | |
|---|---|---|
| EP | 1 473 691 A | 11/2004 |
| EP | 1473581 A2 | 11/2004 |
| EP | 1484635 | 12/2004 |
| FR | 2 824 643 A3 | 11/2002 |
| JP | 62 082454 | 4/1987 |
| JP | 05275401 A1 | 10/1993 |
| JP | 9-127439 | 5/1997 |
| JP | 11211999 | 8/1999 |
| JP | 11211999 A | 11/1999 |
| JP | 2000306515 A | 11/2000 |
| JP | 2002-062490 | 2/2002 |
| JP | 2002277771 A | 9/2002 |
| JP | 2003195201 A | 7/2003 |
| JP | 2004157527 A | 6/2004 |
| JP | 2004235465 A | 8/2004 |
| JP | 2004286825 A | 10/2004 |
| WO | WO9530924 | 11/1995 |
| WO | WO9717628 | 5/1997 |
| WO | WO9952006 A2 | 10/1999 |
| WO | WO9952006 A3 | 10/1999 |
| WO | WO 02/079853 | 10/2002 |
| WO | WO03007049 A1 | 1/2003 |
| WO | WO 03/014789 A2 | 2/2003 |
| WO | WO 03/054925 | 7/2003 |
| WO | WO 03/069404 | 8/2003 |
| WO | WO03069413 A1 | 8/2003 |
| WO | WO03073151 A1 | 9/2003 |
| WO | WO 03/085728 A1 | 10/2003 |
| WO | WO 2004/006003 A1 | 1/2004 |
| WO | WO2004006003 A1 | 1/2004 |
| WO | WO2004026757 A2 | 4/2004 |
| WO | WO 2005/006364 A1 | 1/2005 |
| WO | PCT/US2005/ 026448 | 7/2005 |
| WO | PCT/US2005/030962 | 8/2005 |
| WO | PCT/US2005/034465 | 9/2005 |
| WO | PCT/US2005/029820 | 12/2005 |
| WO | WO 2006/014929 | 2/2006 |

OTHER PUBLICATIONS

IPRP for PCT/US05/030962 filed Aug. 31, 2005.
ISR and WO PCT/US05/030962 filed Aug. 31, 2005.
Fan et al., "Channel Drop Filters in Photonic Crystals," Optics Express, vol. 3, No. 1, 1998.
Fork, et al., "P-67: Chip on Glass Bonding using StressedMetal™ Technology" Sid 05 Digest, May 24, 2005.
Kim et al., "Control of Optical Transmission Through metals Perforated With Subwave-Length Hole Arrays," Optic Letters, vol. 24, No. 4, Feb. 15, 1999, pp. 256-257.
Lin et al., "Free-Space Michromachined Optical Switches for Optical Networking," IEEE Journal of Selected Topics in Quantum Electronics, vol. 5, No. 1m Jan./Feb. 1999, pp. 4-9.
Little et al., "Vertically Coupled Microring Resonator Channel Dropping Filter," IEEE Photonics Technology Letters, vol. 11, No. 2, 1999.
Magel, "Integrated Optic Devices Using Micromachined Metal Membranes," SPIE vol. 2686, 0-8194-2060-Mar. 1996.
Science and Technology, The Economist, May 22, 1999, pp. 89-90.
Butler et al., "An Embedded Overlay Concept for Microsystems Packaging," IEEE Transactions on Advanced Packaging IEEE USA, vol. 23, No. 4, pp. 617-622, XP002379648 (2000).
Chunjun Wang et al., "Flexible curcuit-based RF MEMS Switches," MEMS. XP002379649 pp. 757-762, (Nov. 2001).
Joannopoulos et al., "Molding the Flow of Light," Photonic Crystals. 1995.
Wu et al., "MEMS Designed for Tunable Capacitors," Microwave Symposium Digest, 1998 IEEE MTT-S Int'l., Baltimore, MD, Jun. 7-12, 1998, vol. 1, pp. 127-129.
Zhou et al., "Waveguide Panel Display Using Electromechanical Spatial Modulators," SID Digest, vol. XXIX, 1998.
International Search Report and Written Opinion of the International Searching Authority for PCT/US2005/005919 dated Aug. 24, 2005.

European Search Report Application No. 05255693.3-2217, dated May 24, 2006
European Search Report Application No. EP 05 25 5673 in 9 pages, dated Jan. 23, 2006.
Austrian Search Report No. 161/2005, Dated Jul. 15, 2005.
Austrian Search Report No. 66/2005, Dated May 9, 2005.
Austrian SR Jul. 14, 2005.
Austrian SR Jul. 4, 2005.
Austrian SR Jul. 15, 2005.
Austrian SR Jul. 29, 2005.
Austrian SR Aug. 11, 2005.
Chiou, "A Novel Capacitance Control Design of Tunable Capacitor Using Multiple Electrostatic Driving Electrodes", IEEE-NANO 2001, M3.1 Nanoelectronics and Giga-Scale Systems (Special Session), Oct. 29, 2001, pp. 319-324.
Goossen K.W., "MEMS-Based Variable Optical Interference Devices", Optical MEMS, 2000 IEEE/Leos International Conference on Aug. 21-24, 2000, Piscataway, NJ, USA, IEE, Aug. 21, 2000, pp. 17-18.
Jerman, "A Miniature Fabry-Perot Interferometer Fabricated Using Sillicon Micromachining Techniques", 1988 IEEE Solid-State Sensors Workshop.
Peerlings et al., Long Resonator Micromachined Tunable GaAs-AlAs Fabry-Perot Filter., IEEE Photonics Technology Letters. vol. 9, No. 9., Sep. 1997. pp. 1235-1237.
Akasaka, "Three-Dimensional IC Trends", Proceedings of IEEE, vol. 74, No. 12, pp. 1703-1714, (Dec. 1986).
Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Bass, "Handbook of Optics, vol. I, Fundamentals, Techniques, and Design, Second Edition," McGraw-Hill, Inc., New York, pp. 2.29-2.36 (1995).
Conner, "Hybrid Color Display Using Optical Interference Filter Array," SID Digest, pp. 577-580 (1993).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics", John Wiley & Sons Inc., pp. 568-573, date unknown.
Jerman et al., "A Miniature Fabry-Perot Interferometer with a Corrugated Silicon Diaphragm Support", (1988).
Johnson "Optical Scanners", Microwave Scanning Antennas, vol. 1, p. 251-261, (1964).
Light over Matter, Circle No. 36 (Jun. 1993).
Miles, Mark, W., "A New Reflective FPD Technology Using Interferometric Modulation", The Proceedings of the Society for Information Display (May 11-16, 1997).
Newsbreaks, "Quantum-trench devices might operate at terahertz frequencies", Laser Focus World (May 1993).
Oliner et al., "Radiating Elements and Mutual Coupling", Microwave Scanning Antennas, vol. 2, pp. 131-141, (1966).
Raley et al., "A Fabry-Perot Microinterferometer for Visible Wavelengths", IEEE Solid-State Sensor and Actuator Workshop, Jun. 1992, Hilton Head, SC.

Schnakenberg, et al. TMAHW Etchants for Silicon Micromachining. 1991 International Conference on Solid State Sensors and Actuators-Digest of Technical Papers. pp. 815-818.

Sperger et al., "High Performance Patterned All-Dielectric Interference Colour Filter for Display Applications", SID Digest, pp. 81-83, (1994).

Stone, "Radiation and Optics, An Introduction to the Classical Theory", McGraw-Hill, pp. 340-343, (1963).

Walker, et al., "Electron-beam-tunable Interference Filter Spatial Light Modulator", Optics Letters vol. 13, No. 5, pp. 345-347, (May 1988).

Williams, et al. Etch Rates for Micromachining Processing. Journal of Microelectromechanical Systems, vol. 5, No. 4, pp. 256-259, (Dec. 1996).

Winters, et al. The etching of silicon with XeF2 vapor. Applied Physics Letters, vol. 34, No. 1, pp. 70-73, (Jan. 1979).

Winton, John M., "A novel way to capture solar energy", Chemical Week, (May 1985).

Wu, "Design of a Reflective Color LCD Using Optical Interference Reflectors", ASIA Display '95, pp. 929-931, (Oct. 1995).

Austrian Patent Office Search Report dated Jul. 14, 2005.

\* cited by examiner

PROCESS FOR MODIFYING OFFSET VOLTAGE CHARACTERISTICS OF AN INTERFEROMETRIC MODULATOR

CROSS-REFERENCE TO RELATED APPLICATIONS

This application claims priority to U.S. Provisional Application No. 60/613,499, filed Sep. 27, 2004, which is hereby incorporated by reference in its entirety.

BACKGROUND

1. Field of the Invention

This invention relates to microelectromechanical systems for use as interferometric modulators. More particularly, this invention relates to systems and methods for improving the micro-electromechanical operation of interferometric modulators.

2. Description of the Related Technology

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices.

An embodiment provides a process development method that includes identifying a set of processing parameters for manufacturing an interferometric modulator that results in a non-zero offset voltage for the interferometric modulator. The identified set of processing parameters is then modified to shift the non-zero offset voltage closer to zero. Another embodiment provides a process of manufacturing interferometric modulators developed by such a method. Another embodiment provides an interferometric modulator made by such a process. Another embodiment provides a display device that includes such an interferometric modulator.

Another embodiment provides a process development method that includes identifying a first set of processing parameters for manufacturing a first interferometric modulator and determining a first non-zero offset voltage for the first interferometric modulator manufactured by the first set of processing parameters. The method further includes modifying the first set of processing parameters to create a second set of processing parameters and determining a second offset voltage for a second interferometric modulator manufactured by the second set of processing parameters. The second offset voltage is closer to zero than the first offset voltage.

Another embodiment provides a process development method that includes identifying a means for manufacturing an interferometric modulator that results in a non-zero offset voltage for the interferometric modulator and modifying the means for manufacturing to shift the non-zero offset voltage closer to zero. The means for manufacturing may include a set of processing parameters.

Another embodiment provides a method of modifying an interferometric modulator that includes identifying an interferometric modulator having a non-zero offset voltage and applying a current to the interferometric modulator to thereby shift the non-zero offset voltage closer to zero. Another embodiment provides an interferometric modulator made by such a method.

These and other embodiments are described in greater detail below.

DETAILED DESCRIPTION OF PREFERRED EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The inventors have discovered that existing methods of making interferometric modulators are not entirely satisfactory in that the resulting interferometric modulators may have non-zero offset voltages. Relatively complicated drive schemes have been developed to compensate for the effects of the non-zero offset voltages on device performance, but it in some situations it may be desirable to reduce or avoid such complicated drive schemes. An embodiment provides a process development method that involves modifying the processing parameters used to make interferometric modulators in a manner that shifts the non-zero offset voltage closer to zero. In various embodiments the non-zero offset voltage may be shifted closer to zero by, e.g., modifying one or more deposition parameters used to make the interferometric modulator, applying a current (e.g., a counteracting current) to the interferometric modulator, and/or annealing the interferometric modulator. These and other ways of modifying the processing parameters are described in greater detail below.

Figure 1:
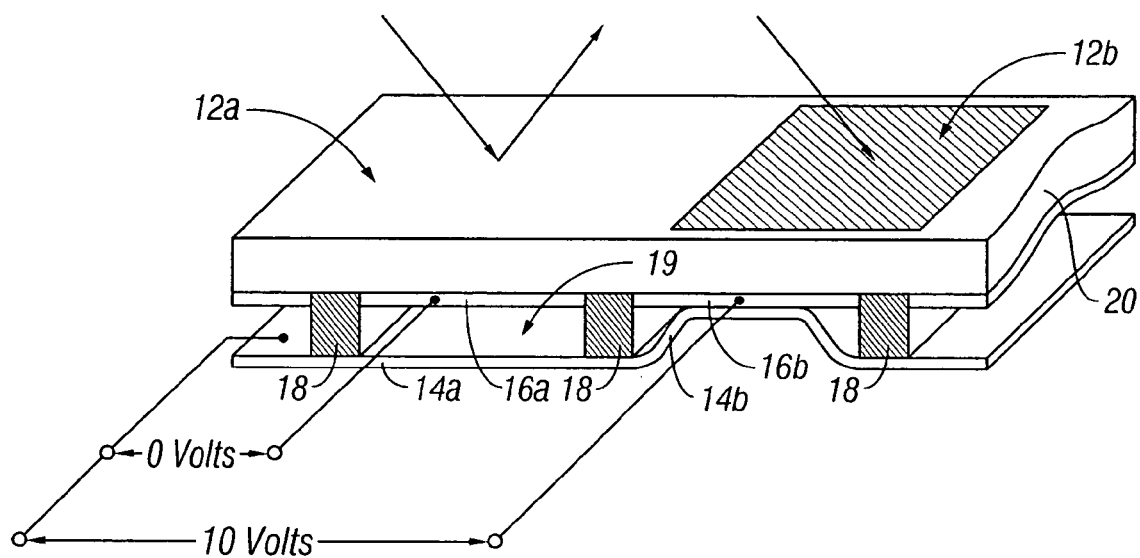
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
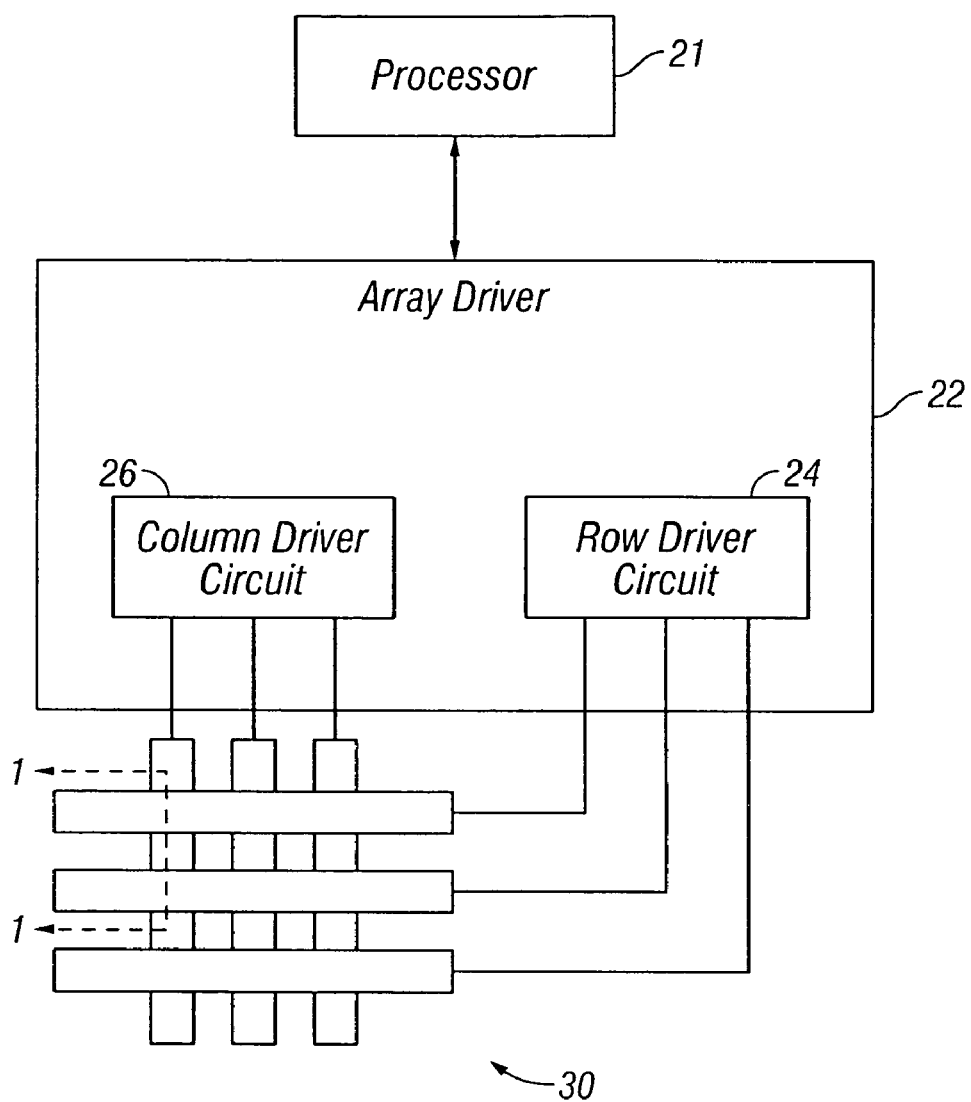
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a panel or display array (display) 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
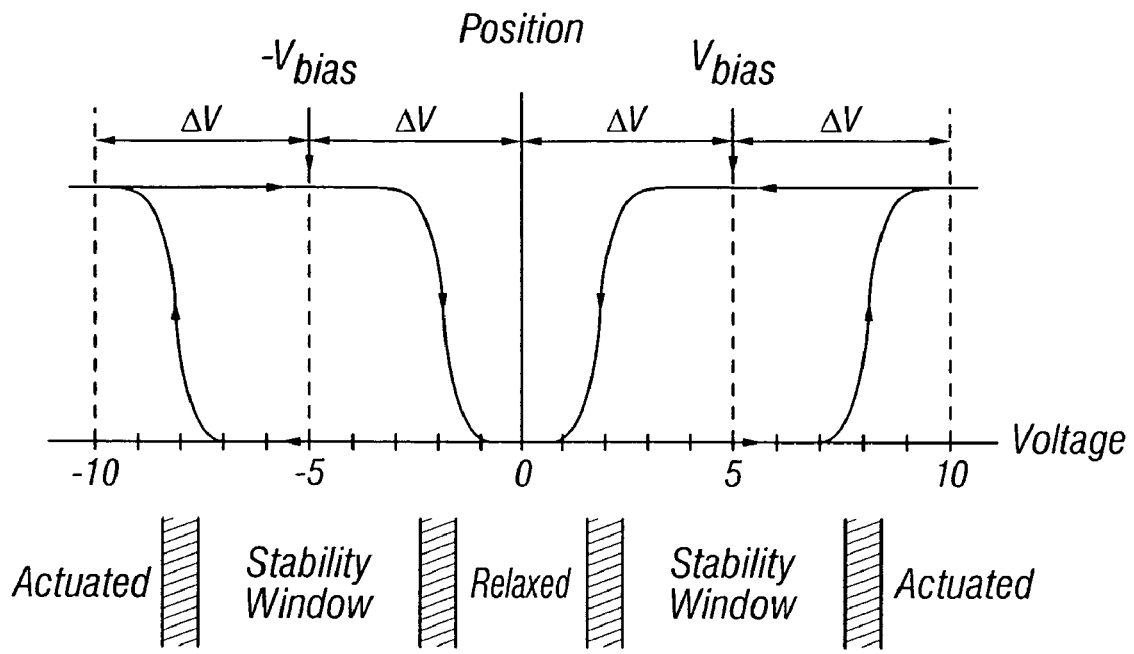
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to $-5$ volts and $+5$ volts respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
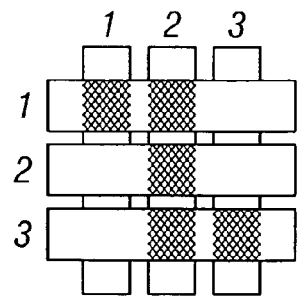
FIGS. 5A and 5B illustrate one exemplary timing diagram for row and column signals that may be used to write a frame of display data to the 3×3 interferometric modulator display of FIG. 2.
Figure 5B:
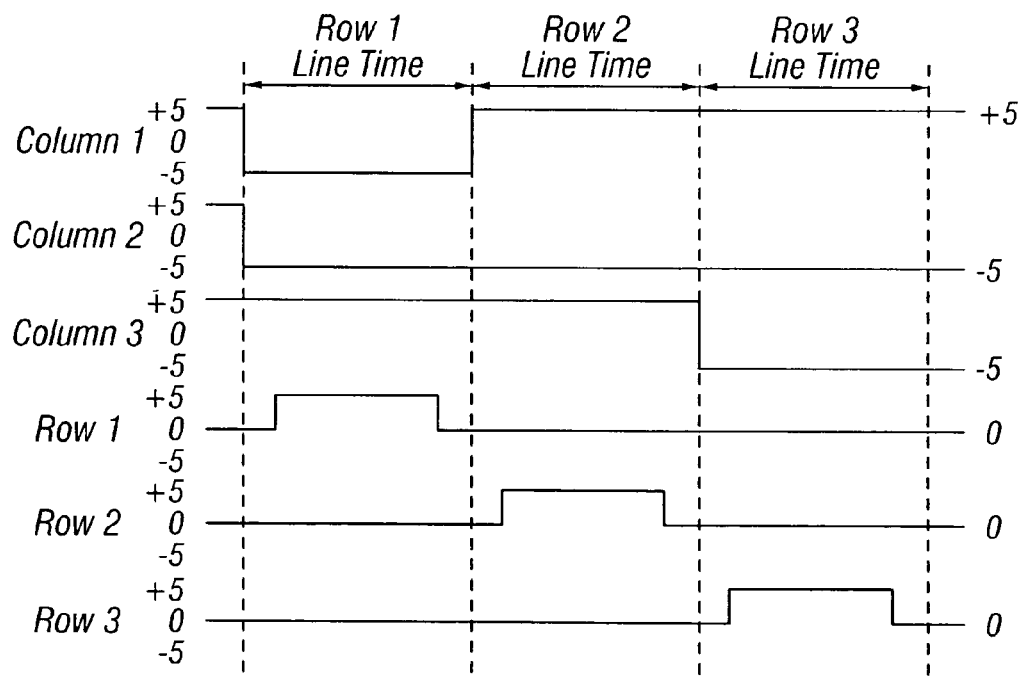

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
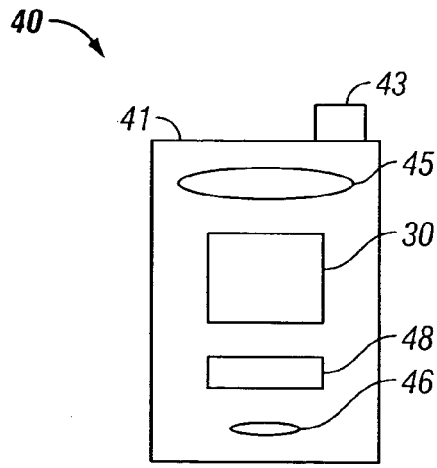
FIGS. 6A and 6B are system block diagrams illustrating an embodiment of a visual display device comprising a plurality of interferometric modulators.
Figure 6B:
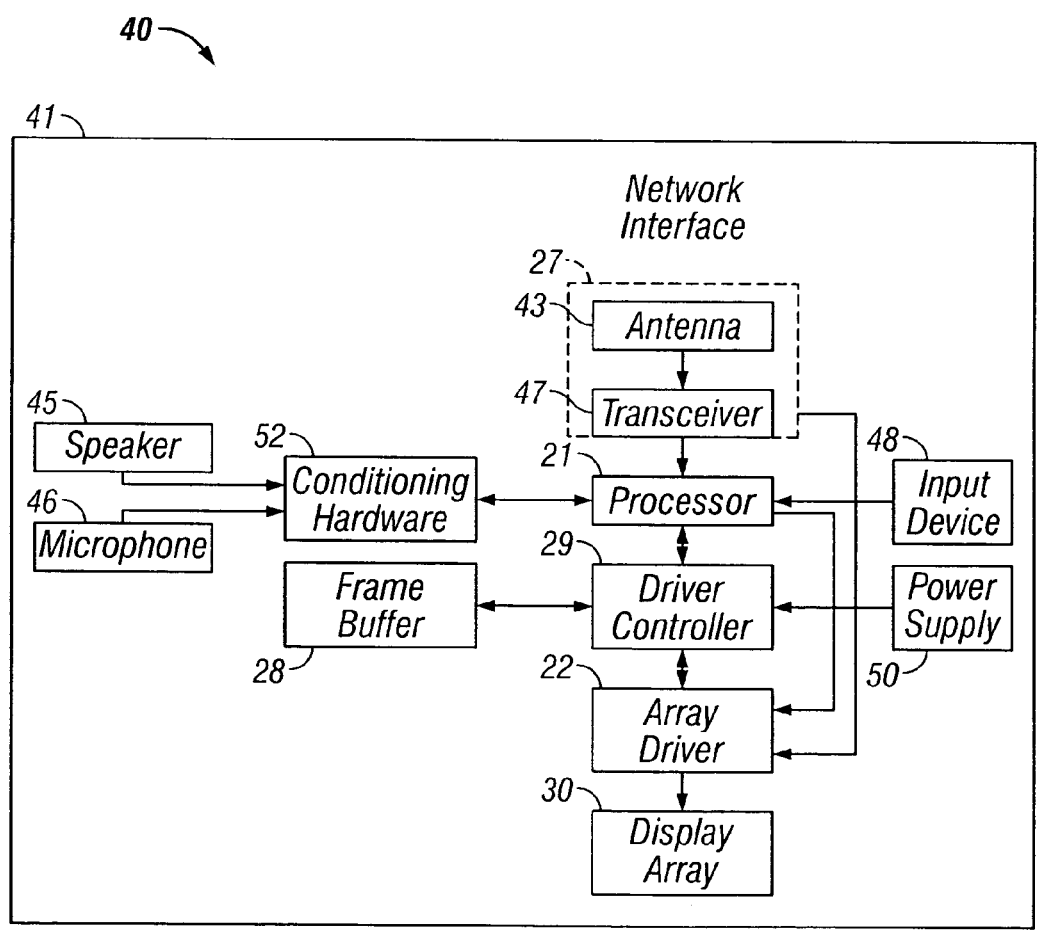

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to the processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28 and to the array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
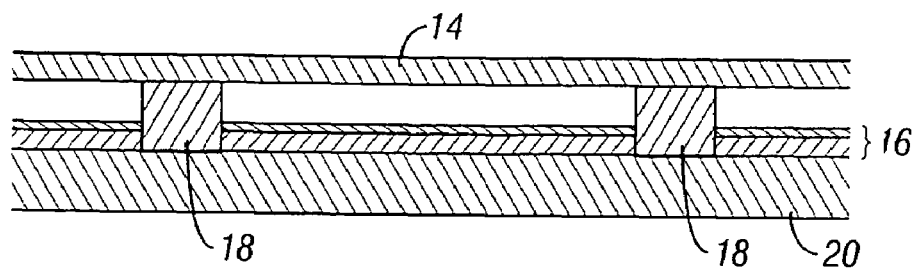
FIG. 7A is a cross section of the device of FIG. 1.
Figure 7B:
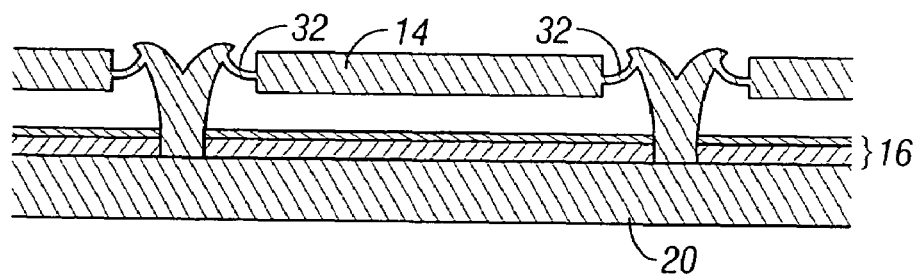
FIG. 7B is a cross section of an alternative embodiment of an interferometric modulator.
Figure 7C:
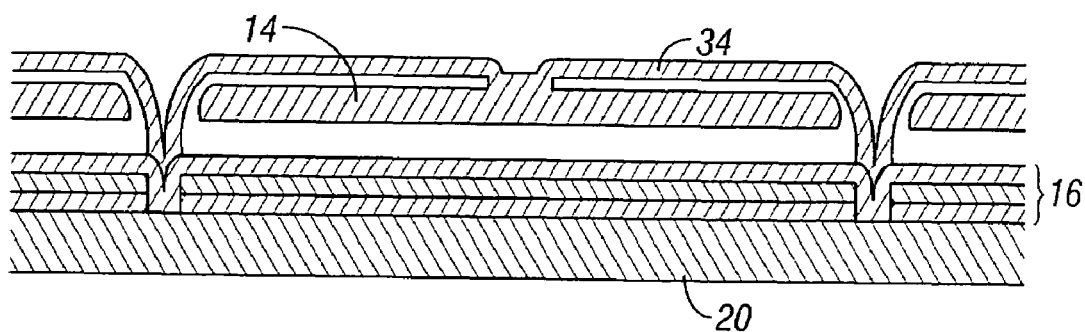
FIG. 7C is a cross section of another alternative embodiment of an interferometric modulator.
Figure 7D:
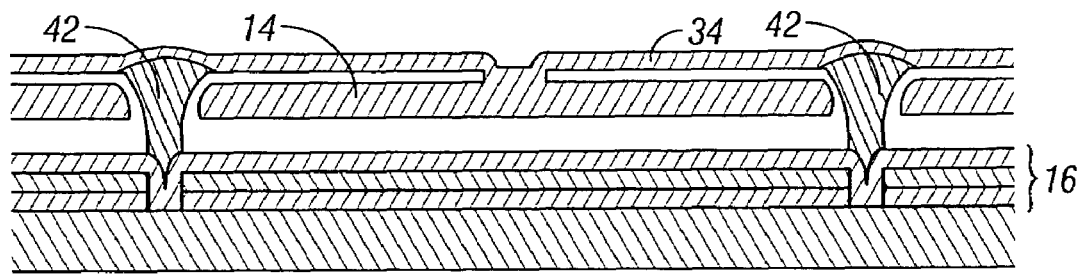
FIG. 7D is a cross section of yet another alternative embodiment of an interferometric modulator.
Figure 7E:
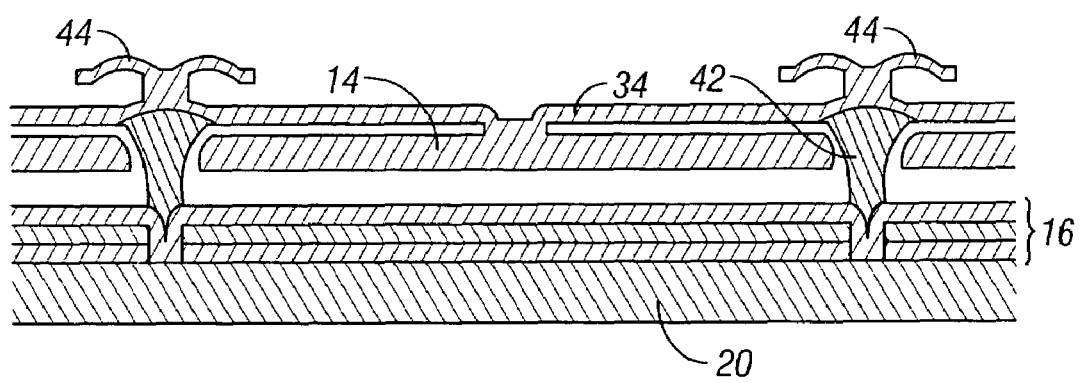
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields some portions of the interferometric modulator on the side of the reflective layer opposite the substrate 20, including the deformable layer 34 and the bus structure 44. This allows the shielded areas to be configured and operated upon without negatively affecting the image quality. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Interferometric modulators are typically manufactured by depositing a series of carefully defined structures onto a substrate in accordance with a set of processing parameters that is designed to produce the desired device configuration. The manufacturing process typically includes, for example, a number of deposition, cleaning, masking, etching, removing, washing, doping, charging, heating, cooling, moving, storing, connecting (e.g., to other components), and/or testing steps that are carried out in a carefully planned sequence designed for efficient production. The individual steps are typically known to those skilled in the art of semiconductor and/or MEMS manufacturing, although the number and type of processing steps carried out in accordance with any particular set of processing parameters may vary significantly from one manufacturing process to another, depending on the type and configuration of the device being manufactured. Those skilled in the art will recognize that, in this context, the term "set of processing parameters for manufacturing an interferometric modulator" refers to the group of individual steps and associated processing conditions used to make the particular interferometric modulator at issue, including (but not limited to) testing and integration of the resulting interferometric modulator into a device such as the display device 40 discussed above. For any particular interferometric modulator manufactured according to a particular process, those skilled in the art are familiar with the set of processing parameters used for manufacturing it.

Figure 8:
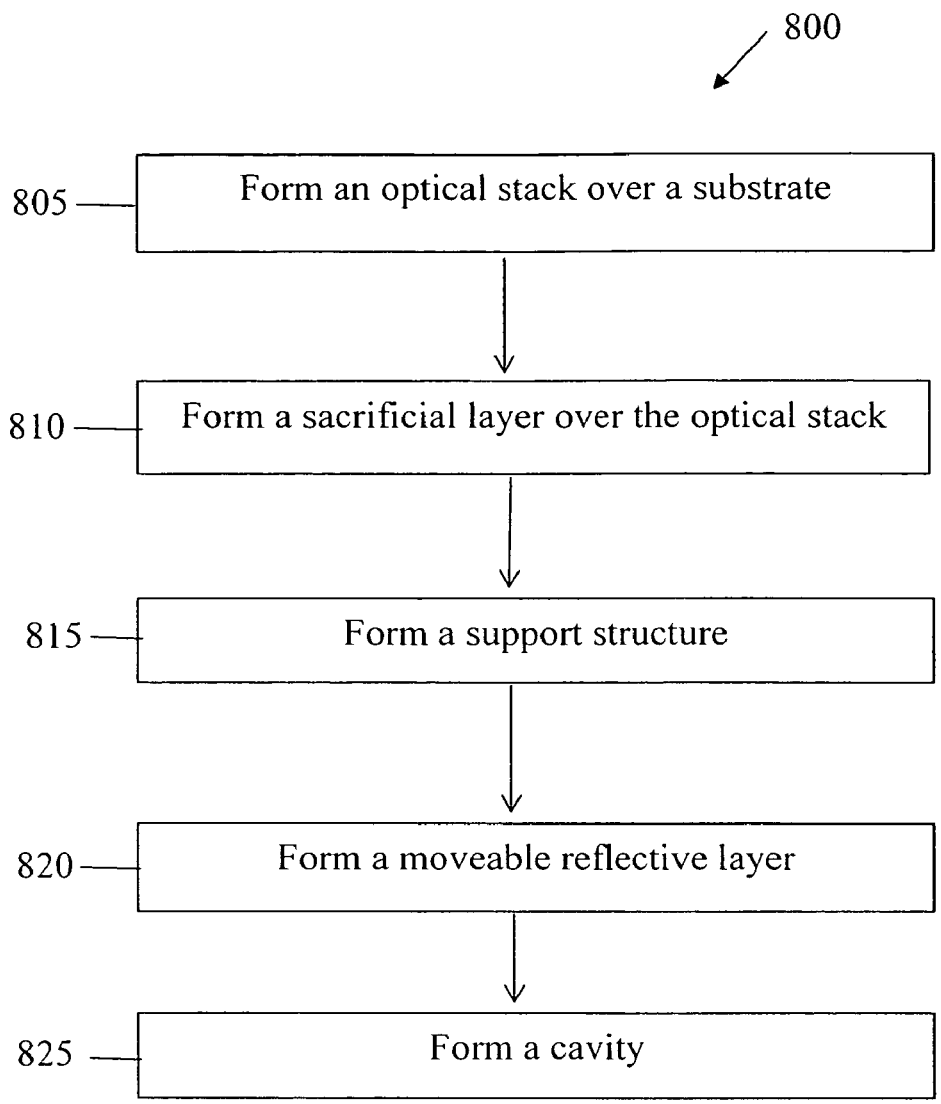
FIG. 8 illustrates certain steps in an embodiment of a manufacturing process for an interferometric modulator.

For example, FIG. 8 illustrates certain steps in an embodiment of a manufacturing process 800 for an interferometric modulator. Such steps may be present in a process for manufacturing, e.g., interferometric modulators of the general type illustrated in FIGS. 1 and 7, along with other steps not shown in FIG. 8. With reference to FIGS. 1, 7 and 8, the process 800 begins at step 805 with the formation of the optical stack 16 over the substrate 20. The substrate 20 may be a transparent substrate such as glass or plastic and may have been subjected to prior preparation step(s), e.g., cleaning, to facilitate efficient formation of the optical stack 16. The optical stack 16 may be formed by employing one or more deposition steps, e.g., conductive layer (e.g., indium tin oxide) deposition, reflective layer (e.g., chromium) deposition, and dielectric layer deposition, along with one or more patterning, masking, and/or etching steps. Various charged species may be generated during step 805, e.g., by ionization during plasma-enhanced chemical vapor deposition (PECVD), and some or all of those charged species may become trapped in the optical stack 16 during deposition. Thus, the set of processing parameters associated with the formation of the optical stack at step 805 may include, e.g., cleaning, deposition (e.g., physical vapor deposition (PVD, e.g., sputter coating), PECVD, thermal chemical vapor deposition (thermal CVD), spin-coating), heating, cooling, patterning, etching and ionization.

The process 800 illustrated in FIG. 8 continues at step 810 with the formation of a sacrificial layer over the optical stack 16. The sacrificial layer is later removed (e.g., at step 825) to form the cavity 19 as discussed below and thus the sacrificial layer is not shown in the resulting interferometric modulator 12 illustrated in FIGS. 1 and 7. The formation of the sacrificial layer over the optical stack 16 may include deposition of a material such as molybdenum or amorphous silicon, in a thickness selected to provide, after subsequent removal, a cavity 19 having the desired size. Deposition of the sacrificial material may be carried out using deposition techniques such as PVD, PECVD, thermal CVD, or spin-coating. Thus, the set of processing parameters associated with the formation of the sacrificial layer over the optical stack at step 810 may include, e.g., cleaning (e.g., cleaning of the optical stack 16 prior to deposition), deposition (e.g., PVD, PECVD, thermal CVD, spin-coating), heating, cooling, patterning, etching and ionization.

The process 800 illustrated in FIG. 8 continues at step 815 with the formation of a support structure e.g., a post 18 as illustrated in FIGS. 1 and 7. The formation of the post 18 may include the steps of patterning the sacrificial layer to form an aperture, then depositing a material (e.g., a polymer, metal or oxide) into the aperture to form the post 18, using a deposition method such as PECVD, thermal CVD, or spin-coating. The upper end of the post 18 may be planarized by, e.g., chemical mechanical polishing (CMP). Thus, the set of processing parameters associated with the formation of the support structure at step 815 may include, e.g., patterning, etching (e.g., forming an aperture in the sacrificial layer and the underlying optical stack 16), deposition (e.g., PECVD, thermal CVD, spin-coating) of the material forming the support structure, ionization, heating, cooling, and polishing.

The process 800 illustrated in FIG. 8 continues at step 820 with the formation of a moveable reflective layer such as the moveable reflective layer 14 illustrated in FIGS. 1 and 7. The moveable reflective layer 14 may be formed by employing one or more deposition steps, e.g., reflective layer (e.g., aluminum) deposition, along with one or more patterning, masking, and/or etching steps. Various charged species may be generated during step 820, e.g., by ionization during PECVD, and some or all of those charged species may become trapped in the moveable reflective layer 14 during deposition. Thus, the set of processing parameters associated with the formation of the moveable reflective layer at step 820 may include, e.g., cleaning, deposition (e.g., PVD, PECVD, thermal CVD, spin-coating), heating, cooling, patterning, etching and ionization.

The process 800 illustrated in FIG. 8 continues at step 825 with the formation of a cavity, e.g., a cavity 19 as illustrated in FIGS. 1 and 7. The cavity 19 may be formed by exposing the sacrificial material (deposited at step 810) to an etchant. For example, a sacrificial material such as molybdenum or amorphous silicon may be removed by dry chemical etching, e.g., by exposing the sacrificial layer to a gaseous or vaporous etchant such as xenon difluoride ($XeF_2$) for a period of time that is effective to remove the desired amount of material. Other etching methods, e.g., wet etching and/or plasma etching, may be also be used. Various charged species may be generated during the formation of the cavity at step 825, e.g., by ionization during PECVD, and some or all of those charged species may become trapped in the optical stack 16 and/or the moveable reflective layer 14. Thus, the set of processing parameters associated with the formation of the cavity at step 825 may include, e.g., heating, cooling, etching and ionization.

Interferometric modulators may be manufactured in accordance with various sets of processing parameters, and thus it will be understood that FIG. 8 shows only a few of the more common steps for the purposes of illustration. It will be also be understood that not all processes for manufacturing interferometric modulators include all the steps illustrated in FIG. 8; that the steps illustrated in FIG. 8 need not necessarily be carried out in the order shown, and that various additional manufacturing steps may be carried out, e.g., testing, back-end processing, and incorporating the interferometric modulator into a display device 40 as illustrated in FIG. 6.

The diagram of movable mirror position versus applied voltage shown in FIG. 3 is for an idealized interferometric modulator having an offset voltage of zero. In this context, the term "offset voltage" refers to the resting voltage potential present across two layers of the interferometric modulator separated by a gap. The offset voltage may be determined by averaging the positive and negative actuation voltages of an interferometric modulator. For an idealized interferometric modulator having an offset voltage of zero, actuation and relaxation of a pixel may be accomplished in a symmetrical fashion. For example, as described above for the embodiment of FIG. 4, actuating a pixel involves setting the appropriate column to $-V_{bias}$, and the appropriate row to $+\Delta V$, which may correspond to $-5$ volts and $+5$ volts respectively. Relaxing the pixel is accomplished by setting the appropriate column to $+V_{bias}$, and the appropriate row to the same $+\Delta V$, producing a zero volt potential difference across the pixel.

Figure 9:
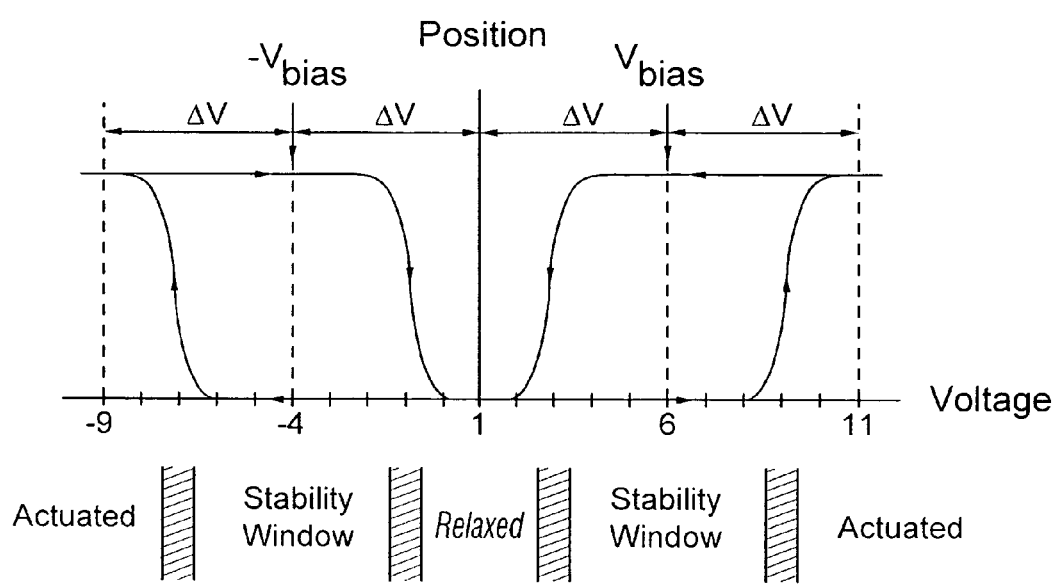
FIG. 9 shows a diagram of movable mirror position versus applied voltage for an interferometric modulator having an offset voltage of 1.0 volts.

Interferometric modulators may be depicted in an idealized fashion as having an offset voltage of zero, but in practice it has been discovered that existing fabrication techniques have not been adequate to reliably manufacture interferometric modulators having an offset voltage of zero. Instead, it has been discovered that interferometric modulators fabricated by existing manufacturing techniques have significant non-zero offset voltages. For example, FIG. 9 shows a diagram of movable mirror position versus applied voltage for an interferometric modulator having an offset voltage of 1.0 volts. It will be appreciated that an actuation protocol such as that illustrated in FIGS. 4 and 5 would be significantly more complicated for an interferometric modulator having a non-zero offset voltage, e.g., for an interferometric modulator having an offset voltage of 1.0 volts as illustrated in FIG. 9. An interferometric modulator having a significant non-zero offset voltage may require higher drive voltages and thus may have undesirably higher power consumption. For example, it is frequently desirable to consider and compensate for the non-zero offset voltage when selecting the operational voltages used to control the moveable reflective layer 14, resulting in significantly more complicated drive schemes.

This invention is not bound by theory of operation, but it is believed that a fixed electrical charge may be associated with one or both of the layers 14, 16 for interferometric modulators fabricated by existing fabrication techniques, and that this fixed electrical charge results in a non-zero offset voltage. For example, charged species may be trapped on or within one or both of the layers 14, 16 during fabrication and/or subsequent processing, producing a fixed electrical charge that is manifested as a non-zero offset voltage in the resulting interferometric modulator 12 and/or the array 30. The non-zero offset voltage may also arise in other ways. It has now been found that, by testing various configurations of layers and various deposition techniques, the amount of fixed electrical charge that is associated with each layer can be modeled and used as a design criteria to select materials and/or layer configurations that minimize the amount of total offset voltage imparted to the interferometric modulator.

Figure 10:
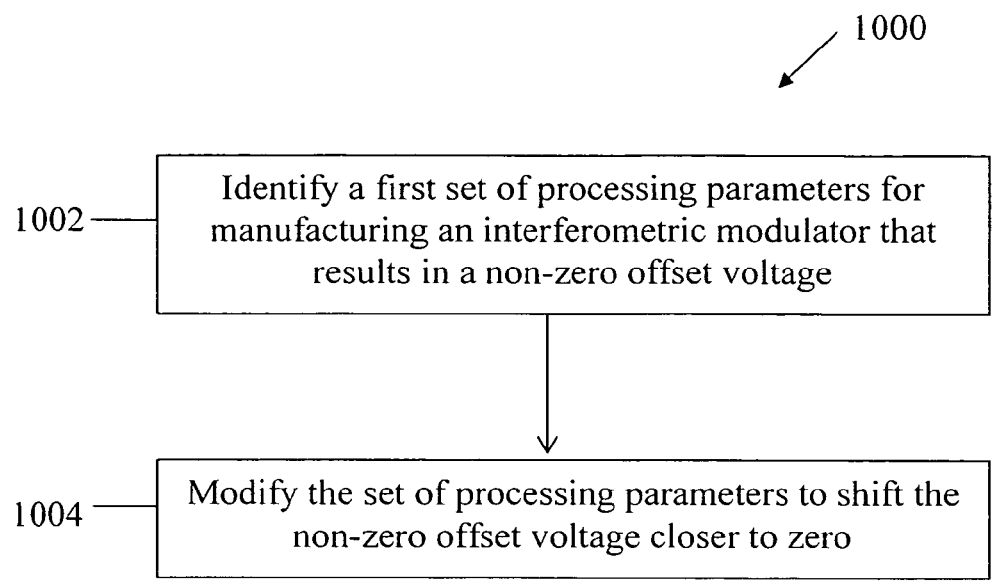
FIG. 10 is a process flow diagram that illustrates an embodiment of a process development method.

FIG. 10 is a process flow diagram that illustrates an embodiment of a process development method that comprises, at step 1002, identifying a set of processing parameters for manufacturing an interferometric modulator that results in a non-zero offset voltage for the interferometric modulator. The set of processing parameters may be identified in various ways. For example, in an embodiment, the set of processing parameters may be the known processing parameters used in an existing process for manufacturing an interferometric modulator. In another embodiment, the set of processing parameters are identified by modeling (e.g., computer modeling) a process for manufacturing an interferometric modulator. Suitable modeling techniques are known to those skilled in the art. Similarly, the resulting non-zero offset voltage may also be determined in various ways, e.g., by measuring the offset voltage of the interferometric modulator produced by the existing process and/or by modeling (e.g., computer modeling). A combination of manufacturing, testing, and/or modeling may be used to identify a suitable set of processing parameters and/or offset voltage(s).

The process development method of FIG. 10 further comprises, at step 1004, modifying the set of processing parameters to shift the non-zero offset voltage closer to zero. The set of processing parameters may be modified in various ways, e.g., by altering the value of one or more selected processing parameters, such as altering the deposition temperature and/or pressure during one or more deposition steps (e.g., the deposition temperature during deposition of a dielectric layer), altering the cleaning temperature and/or pressure during one or more cleaning steps, altering the annealing temperature and/or pressure during one or more annealing steps, and/or altering the etching temperature and/or pressure during one or more etching steps; altering the type of deposition (e.g., sputter coating, plasma-enhanced chemical vapor deposition (PECVD), thermal chemical vapor deposition, spin-coating) used to deposit one or more layers; altering an ionization parameter (e.g., changing a group of ions incorporated into a dielectric layer and/or changing a PECVD parameter such as type and/or pressure of gas, applied voltage, degree of gas ionization, etc.) during one or more fabrication steps such as during deposition, cleaning, annealing and/or etching; altering the thickness and/or configuration of one or more layers, altering the materials used to deposit one or more layers, altering the etching conditions used to remove a sacrificial layer (e.g., replacing a chemical etch with a plasma etch or vice versa), altering the strength and or amount of a current (e.g., a counteracting current and/or a high voltage pulse) passed through the interferometric modulator during fabrication and/or testing, etc. The set of processing parameters may also be modified by adding or subtracting one or more steps from the set of processing parameters, e.g., by depositing an additional layer, by changing (or not changing) the temperature of the interferometric modulator (e.g., annealing by heating for a selected period of time, or removing an existing annealing step), by exposing (or not exposing) the interferometric modulator to a group of ions (e.g., an ionized gas such as a plasma), by passing (or not passing) a current through the interferometric modulator (e.g., by applying a counteracting current and/or a high voltage pulse), etc. The set of processing parameters may be modified by any combination of changing one or more processing parameters, adding one or more processing parameters, and/or subtracting one or more processing parameters.

Figure 11:
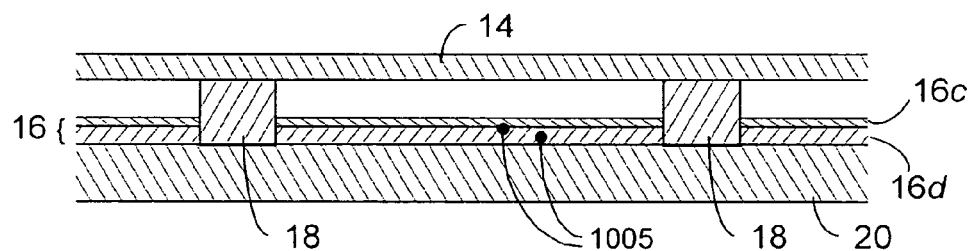
FIG. 11 is a cross section of an embodiment of an interferometric modulator that includes charged components.

In an embodiment, the set of processing parameters may be modified to shift the non-zero offset voltage closer to zero by implanting (or not implanting) one or more materials into one or more of the interferometric modulator layers to change the electrical characteristics of the overall interferometric modulator device. Referring now to FIG. 11, in an embodiment, the optical stack 16 of an interferometric modulator of the general design illustrated in FIG. 7A is modified to include a charged component 1005 in order to shift the non-zero offset voltage closer to zero by, e.g., obtaining a neutrally charged system. In the illustrated embodiment, the charged component 1005 comprises a group of positively charged ions. It will be appreciated that FIG. 11 is not to scale, and that the depicted location of the charged component 1005 in the optical stack 16 is illustrative, as the charged component 1005 may be incorporated into various parts of the optical stack 16. For example, the charged component 1005 may be added to one or more of the various sublayers that may be present in the optical stack 16, e.g., the dielectric sublayer 16c and/or the metal sublayer 16d as depicted in FIG. 11. Other charged components, e.g., a group of negatively charged ions, may be used in place of or in addition to the charged component 1005. Other parts of the interferometric modulator may be modified instead of or in addition to the optical stack 16 in a similar fashion, e.g., the movable reflective layer 14 may be modified to include a charged component 1005 (not shown in FIG. 11). The charged component 1005 may also be incorporated into other types of interferometric modulators, e.g., as illustrated in FIGS. 7B-E.

In another embodiment, the set of processing parameters is modified to reduce or eliminate the amount of charged component incorporated into a layer during a particular processing step. For example, an initial set of processing parameters may include an ionization step (e.g., during PECVD) that results in the incorporation of a charged component into a layer. The set of processing parameters may be modified to shift the non-zero offset voltage closer to zero by reducing or eliminating the ionization step so that less of the charged component is incorporated into the layer. For example, a set of processing parameters that includes a step of removing the sacrificial layer by a plasma etch may be modified by using a chemical etch (e.g., $XeF_2$) to remove the sacrificial layer instead of plasma. Such a modification may also include related adjustments to the materials involved, e.g., replacement of a sacrificial layer material that is removable by a plasma etch with a material that is removable by $XeF_2$ etching.

The incorporation of the charged component 1005 into an interferometric modulator may be achieved in a number of ways. For example, the charged component 1005 may be added to the dielectric material while the dielectric sublayer 16c is being formed on the underlying metal sublayer 16d. As will be appreciated by one of skill in the art, there are a variety of charged components that may be used, and the amount and particular characteristics of these charged components may be varied throughout the process development method illustrated in FIG. 10 by modifying the set of processing parameters. Examples of processing parameters that may be modified include changing the type of deposition, e.g., varying the deposition rate, varying the rate at which deposition gases are supplied to the process, and/or forming a dielectric layer in a PVD tool (which may produce negatively charged species that become incorporated into the dielectric layer) instead of forming the dielectric layer by chemical vapor deposition process (which may produce positively charged species that become incorporated into the dielectric layer). The set of processing parameters may also be modified by altering the amount of hydrogen incorporated into the layer by, e.g., varying the amount and type of deposition gases supplied during deposition. The charged component may be added during deposition by, e.g., carrying out the deposition in the presence of charge species that become trapped within the layer 16 during deposition. The charged component 1005 may also be added after deposition, e.g., by ion implantation. Other methods of incorporating charged components known to those skilled in the art may also be used.

In one embodiment, the set of processing parameters is modified to shift the non-zero offset voltage closer to zero by electrically connecting the optical stack 16 and the movable reflective layer 14 so as to minimize the charge difference between the two layers during fabrication of the interferometric modulator. This may allow for higher yield in production and higher reliability in the final interferometric modulator. This electrical connection may be removed to allow the device to properly function. In one embodiment, this connection between the two layers is created from the same material as that from which the movable reflective layer 14 is formed.

In an embodiment, the set of processing parameters may be modified to shift the non-zero offset voltage closer to zero by passing a current through the interferometric modulator. For example, an initial set of processing parameters may include a step in which a current is passed through an interferometric modulator. Modification of the set of processing parameters may include one or more of modifying the current, e.g., increasing the current, decreasing the current, eliminating the current, applying a counteracting current, and applying a high voltage pulse. In this context, the term "counteracting current" refers to a current that is opposite to the offset voltage bias. In an embodiment, a high voltage pulse is applied for a period of time of about 1 second or less. In this context, a high voltage pulse is a pulse in excess of the amount typically experienced by the interferometric modulator during operation, e.g., in excess of the actuation voltage. In an embodiment, modifying the current comprises applying a counteracting current by applying a voltage of about 10 volts or higher. In another embodiment, modifying the current comprises applying a counteracting current by applying a voltage of about 15 volts or higher.

An interferometric modulator having a non-zero offset voltage may be modified to shift the non-zero offset voltage closer to zero by applying a current to the interferometric modulator. An embodiment thus provides a method of modifying an interferometric modulator, comprising identifying an interferometric modulator having a non-zero offset voltage and applying a current to the interferometric modulator to thereby shift the non-zero offset voltage closer to zero. The interferometric modulator having the non-zero offset voltage may be identified in various ways, e.g., by direct measurement of the offset voltage of a particular interferometric modulator, by modeling (e.g., by computer modeling), and/or by quality control sampling. For example, a non-zero offset voltage may be measured on a particular interferometric modulator that has characteristics representative of a batch of interferometric modulators, thereby identifying other interferometric modulators in the batch as having a non-zero offset voltage. Application of a current to the identified interferometric modulator to thereby shift the non-zero offset voltage closer to zero may also be conducted in various ways as discussed above. For example, the applied current may be a counteracting current and/or a high voltage pulse, e.g., greater than about an actuation voltage of the interferometric modulator.

In some embodiments, the non-zero offset voltage is sufficiently far from zero that the interferometric modulator is considered unacceptable for its intended application. The production of such unacceptable interferometric modulators may undesirably lower manufacturing yield. In this context, a manufacturing yield is the percentage of acceptable devices produced by a particular process, and may be expressed as manufacturing yield=$100 \times N_A/N_T$, where $N_A$ is the number of acceptable devices and $N_T$ is the total number of devices. The total number of devices $N_T$ is the number of acceptable devices $N_A$ plus the number of unacceptable device $N_U$. Thus, when all of the devices are acceptable, the manufacturing yield is 100%. As the number of unacceptable devices $N_U$ increases, however, $N_T$ becomes larger than $N_A$ and the manufacturing yield falls below 100%. In the absence of a suitable repair method, the unacceptable devices are discarded or considered lower grade devices useable in lower value applications than originally intended.

The methods described above, e.g., for passing a current through an interferometric modulator to thereby shift the offset voltage closer to zero, may be used to repair interferometric modulators. Thus, an embodiment provides a method of increasing the manufacturing yield of an interferometric modulator manufacturing process by identifying an interferometric modulator having a non-zero offset voltage and applying a current to the interferometric modulator to thereby shift the non-zero offset voltage closer to zero. For example, the interferometric modulator having the non-zero offset voltage, considered unacceptable prior to application of the current, may be rendered acceptable by applying the current, thus reducing $N_U$ and increasing manufacturing yield. The current may be applied to the interferometric modulator at any stage of the manufacturing process, including after the interferometric modulator has been incorporated into a display device. For example, in an embodiment, the current is applied to the interferometric modulator by an array driver of a display device, e.g., the array driver of the display device into which the interferometric modulator is incorporated.

In an embodiment, the set of processing parameters may be modified to shift the non-zero offset voltage closer to zero by modifying or adding a processing step that comprises annealing the interferometric modulator. This invention is not bound by theory, but it is believed that heating the interferometric modulator may facilitate migration and neutralization of charged components that may have become trapped within the interferometric modulator during manufacturing. Annealing may be conducted by, e.g., increasing the temperature and/or time of an existing heating step, e.g., an existing annealing step or an existing heating step carried out primarily for some other purpose such as during thermal CVD, and/or by adding one or more additional heating steps. Annealing may be conducted over a broad range of temperatures and times. The annealing temperatures and times are preferably selected to facilitate movement and neutralization of charged components. Shorter annealing times are typically appropriate at higher annealing temperatures, and longer annealing times are typically appropriate at lower annealing temperatures. Suitable time/temperature annealing conditions may be determined by routine experimentation. In an embodiment, annealing temperatures are in the range of about 50° C. to about 350° C., and annealing times are in the range of about one minute to about 3 hours.

In another embodiment, particular materials are selected with to optimize the electrochemical characteristics of the materials. Thus, for example, various work function differences may be used to control the final offset voltage of the interferometric modulator or change the charge accumulation rate within the device during operation of the device. For example, one or both of the surfaces of the deformable layer 14 and the optical stack 16 that may come into contact during operation may have a high work function to minimize the transfer of electrons between the layers. In another embodiment, materials to be used to connect the layers 14 and 16 during processing can be selected on the basis of their work function properties.

Figure 12:
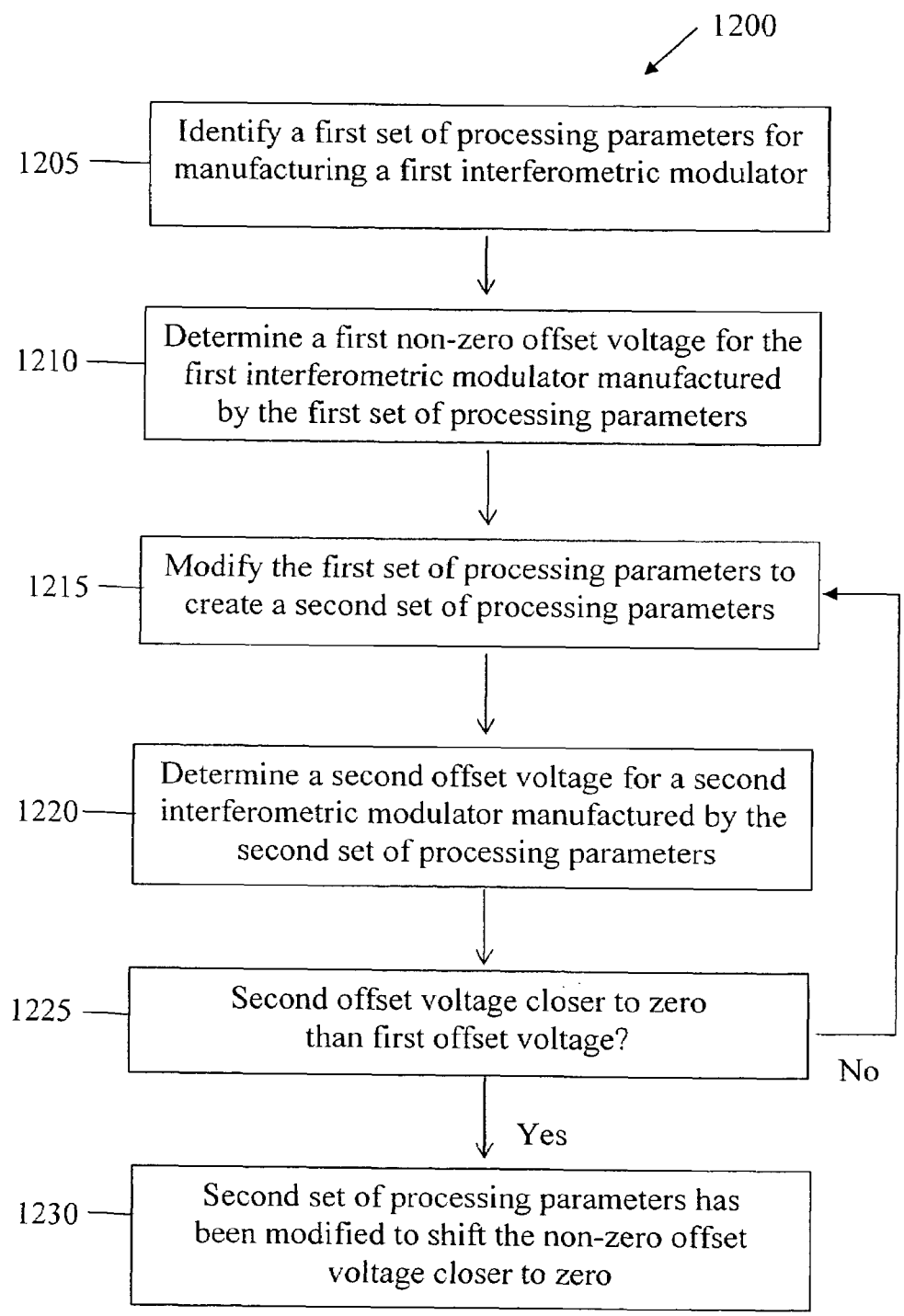
FIG. 12 is a process flow diagram that illustrates an embodiment of a process development method.

The process development embodiment illustrated in FIG. 10 may be practiced in various ways. For example, FIG. 12 is a process flow diagram that illustrates an embodiment of a process development method 1200 that comprises, at step 1205, identifying a first set of processing parameters for manufacturing a first interferometric modulator. The first set of processing parameters may be identified in various ways, as explained with respect to step 1002 in FIG. 10 above. For example, in an embodiment, the first set of processing parameters may be the known processing parameters used in an existing process; in another embodiment, the first set of processing parameters may be identified by modeling (e.g., computer modeling).

FIG. 12 further illustrates, at step 1210, continuing the process development method 1200 by determining a first offset voltage for the first interferometric modulator manufactured by the first set of processing parameters. As discussed above with respect to step 1002 in FIG. 10, the first non-zero offset voltage may be determined in various ways, e.g., by measuring the offset voltage of the interferometric modulator produced by the existing process and/or by modeling (e.g., computer modeling). At step 1215, the process development method 1200 is continued by modifying the first set of processing parameters to create a second set of processing parameters. The first set of processing parameters may be modified in various ways, including by any of the ways discussed above, including modifying an existing processing parameter, adding a processing parameter and/or deleting a processing parameter. The second set of processing parameters is thus a modified version of the first set of processing parameters.

FIG. 12 further illustrates, at step 1220, continuing the process development method 1200 by determining a second offset voltage for a second interferometric modulator manufactured by the second set of processing parameters. As discussed above with respect to step 1210, the second offset voltage may also be determined in various ways, e.g., by measuring the offset voltage of a second interferometric modulator manufactured in accordance with the second set of processing parameters and/or by modeling (e.g., computer modeling). At step 1225, the second offset voltage is compared to the first offset voltage. If the second offset voltage is closer to zero than the first offset voltage, then the process development method illustrated in FIG. 12 has been used to successfully determine that the second set of processing parameters has been modified to shift the non-zero offset voltage closer to zero, as indicated at step 1230. If, at step 1225, the second offset voltage is not closer to zero than the first offset voltage, the process development method 1200 continues by returning to step 1215. The set of processing parameters is then modified by repeating steps 1215, 1220 and 1225 until it is determined that the modified set of processing parameters has been successfully modified to shift the non-zero offset voltage closer to zero.

In the process development flow diagrams illustrated in FIGS. 10 and 12, the set of processing parameters may be modified (e.g., at steps 1004 and 1215, respectively) in various ways. For example, the set of processing parameters may be modified by changing a single process parameter, e.g., a process condition such as deposition temperature. However, the set of processing parameters may include a very large number of individual process parameters, such that it may be relatively time consuming to identify a modified process parameters for which the offset voltage is shifted closer to zero by changing only a single process parameter at a time. Although computer modeling may reduce the need to carry out multiple manufacturing runs, it is often desirable to combine computer modeling with manufacturing runs. In an embodiment, experimental design methods are used to determine the effect of changing various processing parameters and combinations thereof on offset voltage. Experimental design methods per se are well-known, see e.g., Douglas C. Montgomery, "Design and Analysis of Experiments," 2nd Ed., John Wiley and Sons, 1984. Experimental design methods allow various individual process parameters to be changed simultaneously. Thus, in an embodiment, the set of processing parameters is modified by using experimental design methods in which a plurality of individual process parameters are changed simultaneously.

The process development method described above and illustrated in FIGS. 10 and 12 may be used to develop a modified process for manufacturing an interferometric modulator, wherein the interferometric modulator produced by the modified process has an offset voltage that is closer to zero than an interferometric modulator produced by the unmodified process. Thus, an embodiment provides a process of manufacturing an interferometric modulator, wherein the process is developed by a process development method as described herein. The individual process steps in such a process may vary, depending on the design of the particular interferometric modulator produced by the process.

In an embodiment, a process of manufacturing an interferometric modulator, developed by a process development method as described herein, comprises forming an optical stack over a substrate; forming a sacrificial layer over the optical stack; forming a support structure; forming a moveable reflective layer over the sacrificial layer; and forming a cavity. Such a process may be used to advantageously produce an interferometric modulator having an offset voltage that is closer to zero than interferometric modulators produced by existing processes. Thus, an embodiment provides an interferometric modulator produced by such a process. Preferably, the interferometric modulator, produced by a process developed by a process development method as described herein, has improved performance and/or a simpler drive scheme as compared to interferometric modulators produced by existing processes.

The interferometric modulator, produced by a process developed by a process development method as described herein, may be incorporated into various devices, e.g., into an array of interferometric modulators and/or a display device. In an embodiment, such an interferometric modulator is incorporated into a display device as described herein, e.g., as described above with respect to FIGS. 2-6.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A process development method, comprising:
   identifying a set of processing parameters for manufacturing an interferometric modulator that results in a non-zero offset voltage for the interferometric modulator; and
   modifying the set of processing parameters to shift the non-zero offset voltage closer to zero.

2. The method of claim 1, wherein modifying the set of processing parameters comprises modifying a deposition parameter.

3. The method of claim 2, wherein modifying the deposition parameter comprises modifying a deposition temperature.

4. The method of claim 3, wherein modifying the deposition temperature comprises modifying a dielectric layer deposition temperature.

5. The method of claim 1, wherein modifying the set of processing parameters comprises modifying an annealing temperature.

6. The method of claim 1, wherein the set of processing parameters comprises passing a current through the interferometric modulator.

7. The method of claim 6, wherein modifying the set of processing parameters comprises modifying the current.

8. The method of claim 7, wherein modifying the current comprises applying a counteracting current.

9. The method of claim 8, wherein applying the counteracting current comprises applying a high voltage pulse.

10. The method of claim 9 comprising applying the high voltage pulse for a period of about one second or less.

11. The method of claim 1 wherein modifying the set of processing parameters comprises modifying an ionization parameter.

12. The method of claim 11, wherein modifying the ionization parameter comprises changing a group of ions incorporated into a dielectric layer.

13. The method of claim 1, wherein modifying the set of processing parameters comprises adding a process step.

14. The method of claim 13, wherein the added process step comprises heating the interferometric modulator.

15. The method of claim 13, wherein the added process step comprises passing a current through the interferometric modulator.

16. The method of claim 15, wherein the added process step comprises applying a high voltage pulse.

17. The method of claim 1, wherein the offset voltage comprises a resting voltage potential present across two layers of the interferometric modulator.

18. The process development method of claim 1, comprising:
    identifying a first set of processing parameters for manufacturing a first interferometric modulator;
    determining a first non-zero offset voltage for the first interferometric modulator manufactured by the first set of processing parameters;
    modifying the first set of processing parameters to create a second set of processing parameters; and
    determining a second offset voltage for a second interferometric modulator manufactured by the second set of processing parameters, the second offset voltage being closer to zero than the first offset voltage.

19. A process development method, comprising:
    identifying a means for manufacturing an interferometric modulator that results in a non-zero offset voltage for the interferometric modulator; and
    modifying the means for manufacturing to shift the non-zero offset voltage closer to zero.

20. The process development method of claim 19, wherein the means for manufacturing comprises a set of processing parameters.

21. A method of modifying an interferometric modulator, comprising:
    identifying an interferometric modulator having a non-zero offset voltage; and
    applying a current to the interferometric modulator to thereby shift the non-zero offset voltage closer to zero.

22. The method of claim 21, wherein applying the current comprises applying a counteracting current.

23. The method of claim 21, wherein applying the current comprises applying a high voltage pulse.

24. The method of claim 23, wherein the high voltage pulse is greater than about an actuation voltage of the interferometric modulator.

25. The method of claim 21, wherein a manufacturing yield of an interferometric modulator manufacturing process is increased.

26. The method of claim 21, wherein the current is applied by an array driver of a display device.

27. A modified interferometric modulator made by the method of claim 21.

28. A process of manufacturing an interferometric modulator, wherein the process is developed by the method of claim 1.

29. An interferometric modulator made by the process of claim 28.

30. The process of claim 28, comprising:
    forming an optical stack over a substrate;
    forming a sacrificial layer over the optical stack;
    forming a support structure;
    forming a moveable reflective layer over the sacrificial layer; and
    forming a cavity.

31. An interferometric modulator made by the process of claim 30.

32. A display device comprising the interferometric modulator of claim 31.

33. The display device of claim 32, further comprising:
    a display;
    a processor that is in electrical communication with the display, the processor being configured to process image data;
    a memory device in electrical communication with the processor.

34. The display device of claim 33, further comprising:
    a driver circuit configured to send at least one signal to the display.

35. The display device of claim 34, further comprising:
    a controller configured to send at least a portion of the image data to the driver circuit.

36. The display device of claim 33, further comprising:
    an image source module configured to send said image data to said processor.

37. The display device of claim 36, wherein the image source module comprises at least one of a receiver, transceiver, and transmitter.

38. The display device of claim 33, further comprising:
    an input device configured to receive input data and to communicate the input data to the processor.

* * * * *